Figure 1:
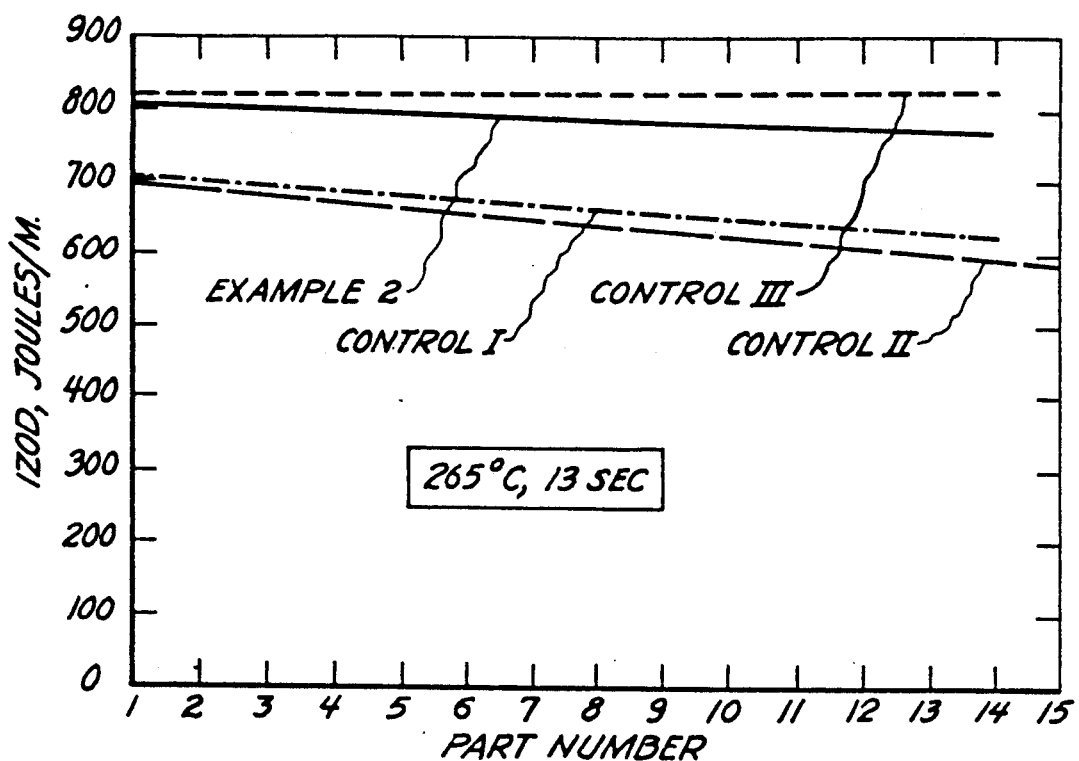

United States Patent [19]

Brown et al.

[11] Patent Number: 5,039,742

[45] Date of Patent: Aug. 13, 1991

[54] POLYPHENYLENE ETHER-POLYESTER MOLDING COMPOSITIONS USEFUL UNDER SEVERE MOLDING CONDITIONS

[75] Inventors: Sterling B. Brown, Schenectady; John R. Campbell, Clifton Park; Timothy J. Shea, Schenectady, all of N.Y.

[73] Assignee: General Electric Company, Schenectady, N.Y.

[21] Appl. No.: 428,712

[22] Filed: Oct. 30, 1989

Related U.S. Application Data

[62] Division of Ser. No. 140,522, Jan. 4, 1988, Pat. No. 4,902,753.

[51] Int. Cl.$^5$ ........................ C08L 51/04; C08L 71/12
[52] U.S. Cl. .......................................... 525/68; 525/67; 525/92; 525/151; 525/152; 525/394; 525/397; 525/905
[58] Field of Search ................... 525/68, 92, 152, 151

[56] References Cited

U.S. PATENT DOCUMENTS

| | | | |
|---|---|---|---|
| 4,090,996 | 5/1978 | Gergen et al. | |
| 4,446,278 | 5/1984 | Loucks | 525/92 |
| 4,614,773 | 9/1986 | Sugio et al. | 525/68 |
| 4,704,430 | 11/1987 | Freitag et al. | |

FOREIGN PATENT DOCUMENTS

WO87/00850  8/1986  PCT Int'l Appl.

*Primary Examiner*—Jacob Ziegler
*Attorney, Agent, or Firm*—William H. Pittman; James C. Davis, Jr.

[57] ABSTRACT

Solvent-resistant resin blends, capable of being molded into parts which vary in properties relatively little over a wide range of molding conditions, are prepared from a polyphenylene ether, a linear polyester such as a poly(alkylene dicarboxylate), a mixture of a bisphenol A homopolycarbonate and block copolymer of a polyphenylene ether and a bisphenol A polycarbonate. Said blends preferably also contain at least one elastomeric polyphenylene ether-compatible impact modifier.

9 Claims, 2 Drawing Sheets

POLYPHENYLENE ETHER-POLYESTER MOLDING COMPOSITIONS USEFUL UNDER SEVERE MOLDING CONDITIONS

This application is a division of application Ser. No. 140,522 filed Jan. 4, 1988, now U.S. Pat. No. 4,902,753.

This invention relates to resinous compositions which are moldable over a wide variety of conditions. More particularly, it relates to compositions having high solvent resistance and comprising polyphenylene ethers and polyesters.

The polyphenylene ethers are a widely used class of thermoplastic engineering resins characterized by excellent hydrolytic stability, dimensional stability, toughness, heat resistance and dielectric properties. They are also resistant to high temperature conditions under many circumstances.

A disadvantage of the polyphenylene ethers which militates against their use in many applications is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are the linear polyesters including poly(alkylene dicarboxylates), especially the poly(alkylene terephthalates). However, such blends frequently undergo phase separation and delamination. They typically contain large, incompletely dispersed polyphenylene ether particles and no adhesion between the two resin phases.

In copending, commonly owned applications Ser. No. 891,457, filed July 29, 1986, and Ser. No. 10,867, filed Feb. 4, 1987, and PCT published application 87/00850, there are disclosed highly compatible polymer blends having a high degree of solvent resistance. These blends comprise at least one polyphenylene ether, at least one poly(alkylene dicarboxylate) and, as a compatibilizer, at least one polymer containing a substantial proportion of aromatic polycarbonate units. Various other ingredients may also be present, particularly elastomeric polyphenylene ether-compatible impact modifiers.

The compositions which are the subject of these applications are useful in a wide variety of applications which require solvent resistance and other high-performance properties. In particular, the impact modified blends have such high impact strengths that they have been found useful for the fabrication of exterior automotive parts, such as fenders and quarter panels.

It is sometimes found, however, that a rather narrow processing window is available for molding these compositions. At molding temperatures up to about 270° C. and molding cycle times up to about 15 seconds, the impact strengths of successively molded parts remain relatively constant. However, an increase in molding temperature or cycle time may cause a substantial drop in impact strength of parts subjected to multiple heating cycles. Thus, a continuing need is to develop resinous compositions of this type which are capable of being molded into highly impact resistant parts using a wider range of molding conditions.

The present invention provides compositions which fill this need. They are capable of being molded into parts with high impact strength and high solvent resistance, said parts varying in properties relatively little over a wide range of molding conditions. In particular, high molding temperatures and long cycle times may be employed without causing pronounced decreases in impact strength. This is accomplished by employing as the polycarbonate constituent of the resin blend a mixture of a bisphenol A homopolycarbonate and a member of a specific class of bisphenol A-polyphenylene ether block copolymers.

In one of its aspects, the invention is directed to resinous compositions comprising the following resinous components and any reaction products thereof, all percentage proportions being by weight of total resinous components:

(A) about 15–70% of at least one polyphenylene ether;

(B) about 20–80% of at least one poly(alkylene dicarboxylate); and (C) from 3% to about 50% of a mixture of:

(C-1) a bisphenol A homopolycarbonate having a weight average molecular weight of at least about 30,000, as determined by gel permeation chromatography relative to polystyrene; and (C-2) a triblock copolymer having a weight average molecular weight in the range of about 10,000–100,000, in which the end blocks are polyphenylene ether blocks having a number average molecular weight in the range of about 2,000–20,000 and the midblock is a bisphenol A polycarbonate block;

the weight ratio of component C-1 to component C-2 being in the range of about 0.3–3.0:1.

Another aspect of the invention defines component C-2 in terms of the method for its preparation. As so defined, it is a block copolymer having a weight average molecular weight in the range of about 10,000–100,000, prepared by an interfacial polycarbonate-forming reaction between bisphenol A and phosgene in the presence of a chain termination agent comprising a polyphenylene ether having a number average molecular weight in the range of about 2,000–20,000.

It is not certain whether any or all of the components in these compositions interact chemically upon blending. Therefore, the invention includes compositions comprising said components and any reaction products thereof, as well as other optional components described hereinafter.

The polyphenylene ethers (also known as polyphenylene oxides) used as all or part of component A in the present invention comprise a plurality of structural units having the formula

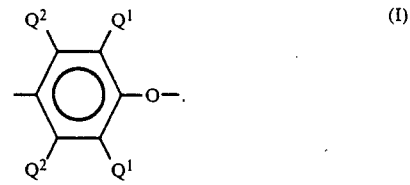

In each of said units independently, each $Q^1$ is independently hydrogen, halogen, primary or secondary lower alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be used in the invention include those which comprise molecules having at least one of the end groups of the formulas

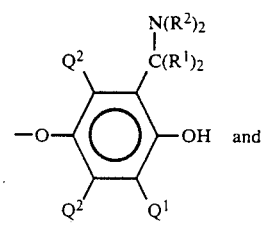
(II)

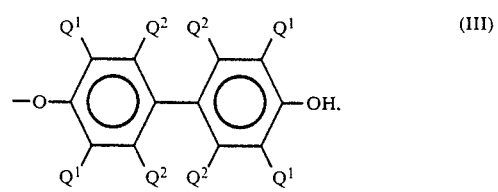
(III)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the end groups of formula II (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

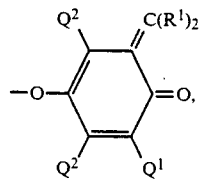
(IV)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

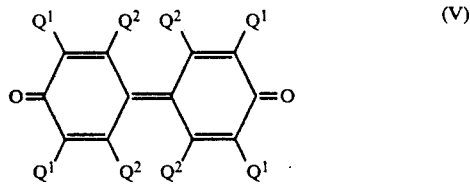

is present, especially in a copper-halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The use of polyphenylene ethers containing substantial amounts of unneutralized amino nitrogen may, under certain conditions, afford compositions with undesirably low impact strengths. The possible reasons for this are explained hereinafter. The amino compounds include, in addition to the aminoalkyl end groups, traces of amine (particularly secondary amine) in the catalyst used to form the polyphenylene ether.

It has further been found that the properties of the compositions can often be improved in several respects, particularly impact strength, by removing or inactivating a substantial proportion of the amino compounds in the polyphenylene ether. The polymers so treated contain low proportions of unneutralized amino nitrogen, generally amounts no greater than 800 ppm. and preferably in the range of about 200–800 ppm. Various means for inactivation have been developed and any one or more thereof may be used.

One such method is to precompound the polyphenylene ether with at least one non-volatile compound containing a carboxylic acid, acid anhydride or ester group, which is capable of neutralizing the amine compounds. This method is of particular interest in the preparation of compositions of this invention having high resistance to heat distortion. Illustrative acids, anhydrides and esters are citric acid, malic acid, agaricic acid, succinic acid, succinic anhydride, maleic acid, maleic anhydride, citraconic acid, citraconic anhydride, itaconic acid, itaconic anhydride, fumaric acid, diethyl maleate and methyl fumarate. Because of their relatively high reactivity with amino compounds, the free carboxylic acids and especially fumaric acid are generally most useful.

Reaction of the polyphenylene ether with the acid or anhydride may be achieved by heating at a temperature within the range of about 230°–390° C., in solution or preferably in the melt. In general, about 0.3–2.0 and preferably about 0.5–1.5 part (by weight) of acid or anhydride is employed per 100 parts of polyphenylene ether. Said reaction may conveniently be carried out in an extruder or similar equipment.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of reducing the pressure to about 20 torr or less.

It is believed that these inactivation methods aid in the removal by evaporation or the neutralization of any traces of free amines (predominantly secondary amines) in the polymer, including amines generated by conversion of aminoalkyl end groups to quinone methides of the type represented by formula IV. Polyphenylene ethers having a free amine nitrogen content below about 600 ppm. have been found particularly useful in this invention. However, the invention is not dependent on any theory of inactivation.

Component B is at least one linear polyester. The linear polyesters include thermoplastic poly(alkylene dicarboxylates) and alicyclic analogs thereof. They typically comprise structural units of the formula

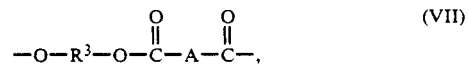

wherein $R^3$ is a saturated divalent aliphatic or alicyclic hydrocarbon radical containing about 2–10 and usually about 2–6 carbon atoms and A is a divalent aromatic radical containing about 6–20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly polyethylene and polybutylene terephthalate and especially the latter, are preferred. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

Because of the tendency of polyesters to undergo hydrolytic degradation at the high extrusion and molding temperatures encountered by the compositions of this invention, it is preferred that the polyester used as component B be substantially free of water.

The polyesters generally have number average molecular weights in the range of about 20,000–70,000, as determined by intrinsic viscosity (IV) at 30° C. in a mixture of 60% (by weight) phenol and 40% 1,1,2,2-tetrachloroethane. When resistance to heat distortion is an important factor the polyester molecular weight should be relatively high, typically above about 40,000.

Because of the presence of both poly(alkylene dicarboxylates) and polymers containing carbonate units in the compositions of this invention, there is a possibility for ester-carbonate exchange resulting in degradation of one or both polymers, particularly at high molding temperatures. It is, therefore, sometimes preferred to incorporate in the compositions an agent which suppresses such exchange, typically in the amount of about 0.01–7.5% by weight of total polyester. It is generally preferred to precompound said exchange suppressing agent with the polyester. Precompounding may be achieved by direct blending or by forming a concentrate, typically with about 1–25% by weight of the polyester, and adding said concentrate to the remaining portion thereof.

Illustrative exchange suppressing agents are hydroxyaromatic compounds such as the hydroxybenzophenones disclosed in U.S. Pat. No. 4,452,932; salicylate compounds such as methyl salicylate, disclosed in U.S. Pat. No. 4,452,933; and sodium and potassium dihydrogen phosphates disclosed in U.S. Pat. No. 4,532,290. The disclosures of all of the foregoing patents relating to polyesters are also incorporated by reference herein.

The tendency of blends of components A and B to be incompatible is overcome by incorporating component C in the composition. One essential ingredient of component C is (C-1) a bisphenol A homopolycarbonate.

Various methods of preparing polycarbonate homopolymers are known, and any of them may be used for preparing component C-1. They include interfacial and other methods in which phosgene is reacted with bisphenol A, transesterification methods in which bisphenol A is reacted with diaryl carbonates, and methods involving conversion of bisphenol A cyclic polycarbonate oligomers to linear polycarbonates. The latter method is disclosed, for example, in U.S. Pat. Nos. 4,605,731 and 4,644,053.

The weight average molecular weight of the homopolycarbonate should be at least about 30,000, as determined by gel permeation chromatography relative to polystyrene. It is most often in the range of about 40,000–250,000 and especially about 80,000–220,000.

The other essential ingredient of component C is (C-2) a block polyphenylene ether-bisphenol A polycarbonate. More particularly, said block copolymer is one which has a weight average molecular weight in the range of about 10,000–100,000 and preferably about 40,000–85,000.

In one aspect of the invention, component C-2 is a triblock copolymer in which the end blocks are polyphenylene ether blocks having a number average molecular weight in the range of about 2,000–20,000, preferably about 5,000–10,000. They are most often poly(2,6-dimethyl-1,4-phenylene ether) blocks. The midblock is, as previously indicated, a bisphenol A polycarbonate block.

Such block polyphenylene ether-polycarbonates are known in the art and may be prepared by conventional methods. In another aspect of the invention, they are defined in terms of the method described hereinabove.

Exemplary methods for preparing such block copolymers will be found, for example, in U.S. Pat. No. 4,374,959, the disclosure of which is incorporated by reference herein. Said methods are conventional interfacial methods for preparing polycarbonates by the reaction of bisphenol A with phosgene in an alkaline two-phase system comprising water and a water-immiscible organic liquid such as methylene chloride. Also employed is a tertiary amine catalyst, and, optionally, a phase transfer agent. In addition, the relatively low molecular weight polyphenylene ether described hereinabove is incorporated in the reaction mixture as a chain termination agent for polycarbonate formation, thus providing the required polyphenylene ether blocks.

The preparation of a block polyphenylene etherpolycarbonate suitable for use as component C-2 is illustrated by the following example.

Example 1

A mixture of 8.5 liters of methylene chloride, 1230 grams (176 mmol.) of a poly(2,6-dimethyl-1,4-phenylene ether) having a number average molecular weight of 7000 and an intrinsic viscosity of 0.224 in chloroform at 25° C., 7.26 liters of deionized water, 1140 grams (5 moles) of bisphenol A and 10.5 ml. (75 mmol.) of triethylamine was stirred and adjusted to a pH in the range of 8–11 by addition of 50% aqueous sodium hydroxide solution. Phosgene was bubbled into the mixture, with stirring, at 35 grams per minute for 44 minutes, to a total of 1545 grams (15.6 moles), with sodium hydroxide being added to maintain the pH in the range of 11–12 for the first three minutes and at 13 for the remainder of the reaction. A total of 4000 ml. of sodium hydroxide solution was employed.

After phosgene addition was complete, the mixture was agitated for 10 minutes. The mixture was diluted with 6 liters of chloroform and 4 liters of deionized water and separated by centrifugation. The organic phase was extracted with 10 liters of dilute aqueous hydrochloric acid solution and washed with four 10-liter portions of deionized water. Methanol was added to precipitate the block copolymer, which was filtered, washed with methanol and dried in a fluid bed dryer under nitrogen at 90° C.

The product had a weight average molecular weight of about 76,700. The molecular weight and results of hydroxy group analysis were consistent with the formation of a triblock copolymer.

The weight ratio of component C-1 to component C-2 in the compositions of this invention is in the range of about 0.3–3.0:1 and most often about 0.8–1.2:1. Most desirably, equal weight proportions of components C-1 and C-2 are employed.

In many applications, such as for molding exterior automotive parts, it is necessary for the compositions of this invention to have very high impact strengths. This may be conveniently achieved by incorporating a polyphenylene ether-compatible impact modifier therein. Accordingly, another aspect of the invention is resinous compositions comprising the following and any reaction products thereof: about 10–45% of component A, about 10–55% of component B, from 3% to about 40% of component C and (D) about 8–25% of at least one elastomeric polyphenylene ether-compatible impact modifier.

Suitable impact modifiers include various elastomeric copolymers, of which examples are ethylene-propylenediene polymers (EPDM's), both unfunctionalized and functionalized with (for example) sulfonate or phosphonate groups; carboxylated ethylene-propylene rubbers; block copolymers of alkenylaromatic compounds such as styrene with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in U.S. Pat. No. 4,681,915.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to remove (preferably) or lower the proportion of aliphatic unsaturation therein by selective hydrogenation. The weight average molecular weights of the impact modifiers are typically in the range of about 50,000-300,000. Block copolymers of this type are commercially available from Shell Chemical Company under the trademark KRATON, and include KRATON D1101, G1650, G1651, G1652, G1657 and G1702.

As previously mentioned, the proportions of components A and B in the impact modifier-free compositions of this invention are about 15-70% and about 20-80%, respectively. Most often, the weight ratio of A to B is up to about 1.2:1. The proportion of component C is from 3% to about 50%. The preferred ranges are about 20-40% for component A, about 40-75% for component B and about 5-40% for component C.

When the composition includes component D, the impact modifier, the following are the broad and preferred ranges:

| Component | Broad | Preferred |
|---|---|---|
| A | about 10-65% | about 15-35% |
| B | about 10-55% | about 15-50% |
| C | 3-about 40% | about 5-35% |
| D | about 8-25% | about 5-20% |

For the most part, lower proportions of component C are accompanied by higher heat distortion temperatures. Therefore, compositions in which the proportion of component C is minimized may be advantageous when high temperatures (e.g., above about 150° C.) will be encountered after molding.

It is within the scope of the invention for the composition to contain other conventional ingredients such as fillers, reinforcing materials (e.g, glass fibers), flame retardants, pigments, dyes, stabilizers, anti-static agents, mold release agents and the like. The presence of other resinous components is also contemplated. These include impact modifiers compatible with component B, such as various graft and core-shell copolymers of such monomers as butadiene, styrene, butyl acrylate and methyl methacrylate. It is frequently preferred to preextrude such impact modifiers with component B prior to its utilization in the invention.

Also included as other resinous components are other impact and processability modifiers for component A, such as olefin copolymers. In general, the amounts of any other resinous components, if present, will not exceed about 15% by weight of total resin.

The preparation of the compositions of this invention is normally achieved by merely blending the ingredients thereof under conditions adapted for the formation of an intimate blend. Such conditions often include extrusion, which may be conveniently effected in a screw-type or similar extruder which applies a substantial shearing force to the composition, thereby decreasing the particle size of the dispersed phase. The extrusion temperature is generally in the range of about 100°-325° C.

In one embodiment of the invention, a single extruder is employed which has at least two ports for introduction of ingredients, one such port being downstream from the other. Component A is introduced through the first port and extruded, preferably at a temperature in the range of about 300°-350° C. This portion of the extruder is preferably vacuum vented.

The remaining ingredients are introduced through the downstream port and extrusion is continued, preferably at a lower temperature to minimize degradation of component B. Typical extrusion temperatures at this stage are in the range of about 260°-320° C.

The invention is illustrated by the following example.

Example 2

Component A was a poly(2,6-dimethyl-1,4-phenylene ether) having a number average molecular weight of about 20,000 and an intrinsic viscosity in chloroform at 25° C. of 0.46 dl./g., which had been extruded on a twin screw extruder within the temperature range of about 300°-315° C., with vacuum venting to a maximum pressure of 20 torr. Component B was a poly(butylene terephthalate) having a number average molecular weight, as determined by gel permeation chromatography, of about 50,000. As component C, there was employed a mixture of equal portions of the product of Example 1 and a bisphenol A homopolycarbonate prepared interfacially and having a weight average molecular weight of about 192,000. Component D was a commercially available triblock copolymer with polystyrene end blocks having weight average molecular weights of 29,000 and a hydrogenated butadiene midblock having a weight average molecular weight of 116,000.

The ingredients were tumble mixed on a jar mill and extruded on a twin screw extruder at temperatures from 121° to 271° C. The extrudate was pelletized and dried at 100° C., after which it was injection molded into notched Izod test bars, using a molder with a barrel capacity equivalent to the volume of about six of said test bars. Numerous bars were molded in sequence and tested for impact strengths. The results are listed in the following table, in comparison with three controls.

| % by weight | Invention | Controls | | |
|---|---|---|---|---|
| | | I | II | III |
| Component A | 27.3 | 30 | 28.6 | 27.3 |
| Component B | 41.8 | 46 | 43.8 | 41.8 |
| Component C: | | | | |
| Homopolycarbonate | 9.1 | 10 | 14.3 | — |
| Block copolycarbonate | 9.1 | — | — | 18.2 |
| Component D | 12.7 | 14 | 13.3 | 12.7 |

Reference is now made to the drawings which represent graphically the impact strengths of successively molded test bars at various temperatures and molding cycle times. From FIG. 1 (265° C., 13 seconds), it will be seen that the compositions of this invention are relatively constant in impact strength but are not quite as constant as Control III, which employed only the block polyphenylene ether-polycarbonate, under very mild molding conditions. Controls I and II, employing homopolycarbonate at various levels, had substantially lower impact strengths.

Figure 2:
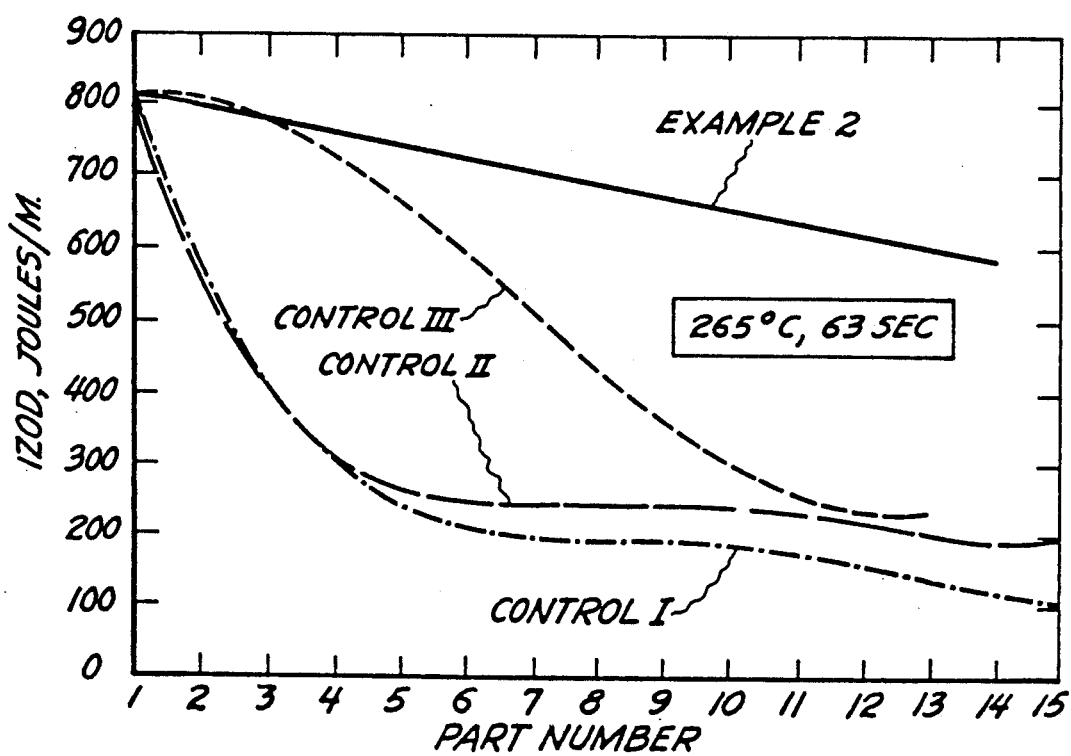

In FIG. 2, the same temperature but a longer molding cycle time was employed. It is apparent that the improvement in impact strength provided by the composition of this invention as compared with the controls is substantially greater with continued molding under these more severe conditions.

Figure 3:
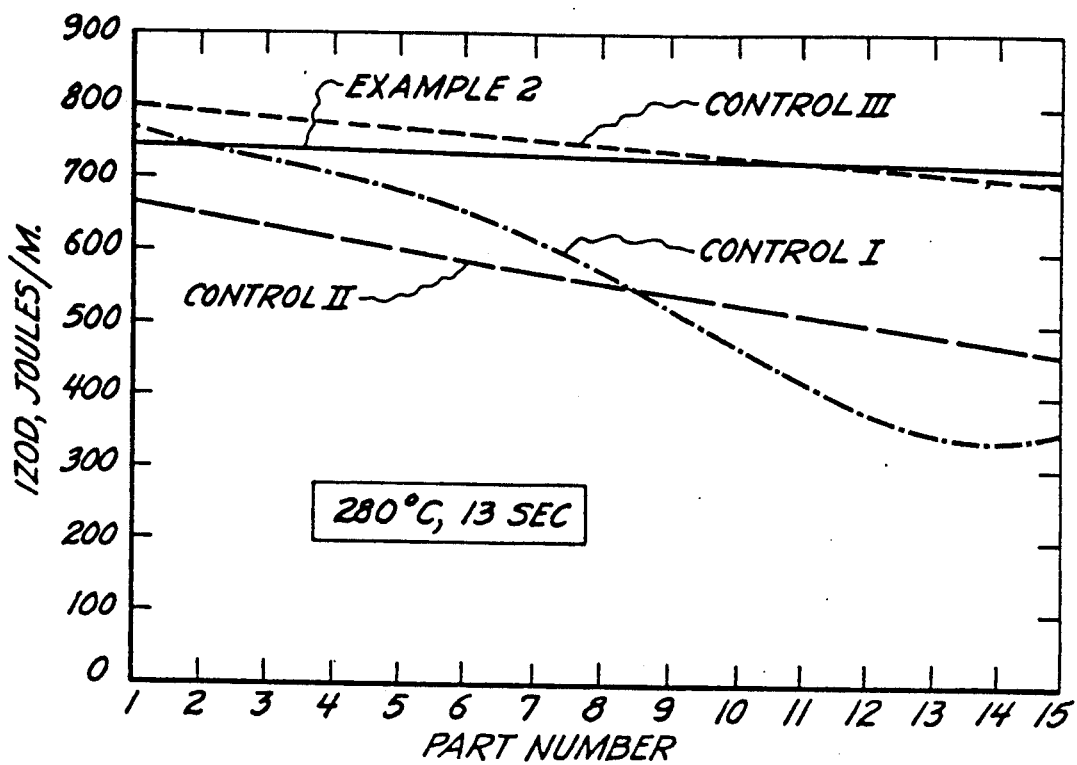

In FIG. 3, a higher temperature but shorter cycle time was employed. Again, the composition of this invention is comparable in impact strength to Control III; however, under these conditions the composition of this invention is more constant in impact strength than said control as successive parts are molded.

Figure 4:
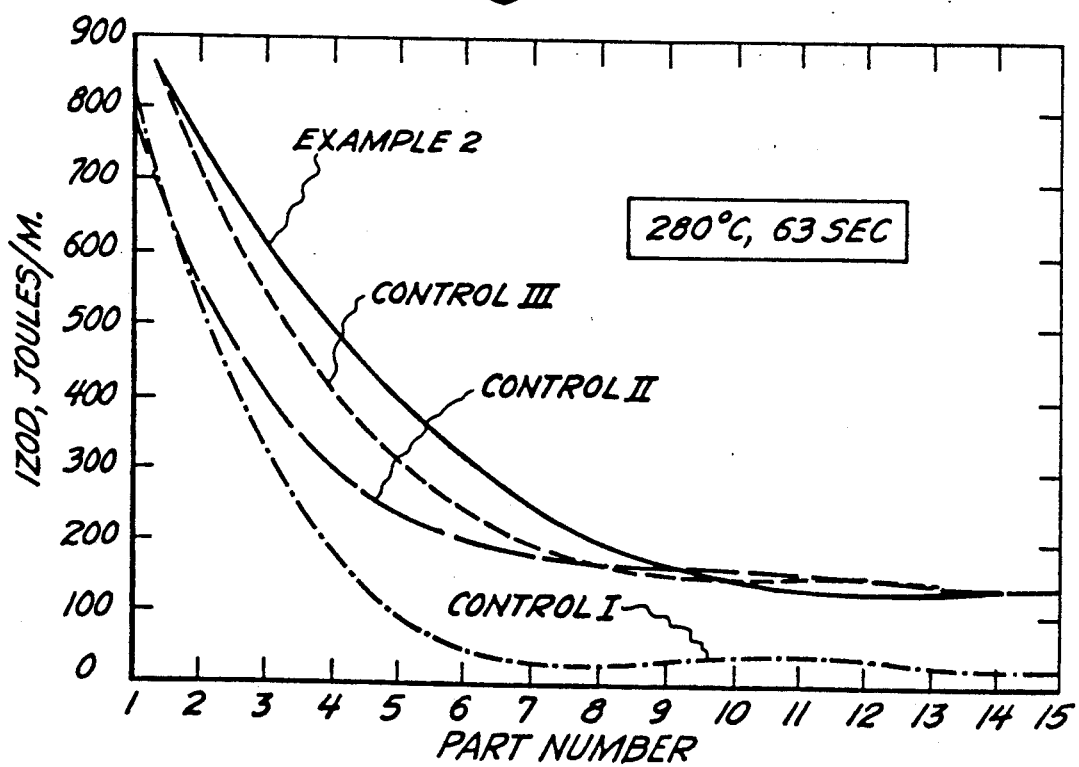

In FIG. 4, both the higher temperature and the longer cycle time were employed. The decrease in impact strength is pronounced for all samples but considerably less so for the composition of this invention than for any of the controls, particularly for test bars up to the eighth.

What is claimed is:

1. A resinous composition which comprises the following resinous components and any reaction products thereof, all percentage proportions being by weight of total resinous components:
    (A) about 10–65% of at least one polyphenylene ether;
    (B) about 10–55% of at least one poly(alkylene dicarboxylate);
    (C) from 3% to about 40% of
    (C-1) a bisphenol A homopolycarbonate having a weight average molecular weight of at least about 30,000, as determined by gel permeation chromatography relative to polystyrene; and
    (C-2) a triblock copolymer having a weight average molecular weight in the range of about 10,000–100,000, in which the end blocks are polyphenylene ether blocks having a number average molecular weight in the range of about 2,000–20,000 and the midblock is a bisphenol A polycarbonate block;
    the weight ratio of component C-1 to component C-2 being in the range of about 0.3–3.0:1; and
    (D) about 8–25% of at least one elastomeric polyphenylene ether-compatible impact modifier.

2. A resinous composition which comprises the following resinous components and any reaction products thereof, all percentage proportions being by weight of total resinous components:
    (A) about 10–45% of at least one polyphenylene ether;
    (B) about 10–55% of at least one poly(alkylene dicarboxylate);
    (C) from 3% to about 40% of a mixture of:
    (C-1) a bisphenol A homopolycarbonate having a weight average molecular weight of at least about 30,000, as determined by gel permeation chromatography relative to polystyrene; and
    (C-2) a block copolymer having a weight average molecular weight in the range of about 10,000–100,000, prepared by an interfacial polycarbonate-forming reaction between bisphenol A and phosgene in the presence of a chain termination agent comprising a polyphenylene ether having a number average molecular weight in the range of about 2,000–20,000;
    the weight ratio of component C-1 to component C-2 being in the range of about 0.3–3.0:1; and
    (D) about 8–25% of at least one elastomeric polyphenylene ether-compatible impact modifier.

3. A composition according to claim 1 or 2 wherein the polyphenylene ether is a poly(2,6-dimethyl-1,4-phenylene ether).

4. A composition according to claim 3 wherein component D is a block copolymer of at least one alkenylaromatic compound and at least one diene.

5. A composition according to claim 4 wherein component B is a poly(butylene terephthalate) having a number average molecular weight in the range of about 20,000–70,000, and component D is a triblock copolymer wherein the end blocks are derived from styrene and the midblock is derived from at least one of isoprene, and butadiene.

6. A composition according to claim 5 wherein the aliphatic unsaturation in the midblock of component D has been removed by selective hydrogenation.

7. A composition according to claim 5 wherein component C-1 has a weight average molecular weight in the range of about 80,000–220,000.

8. A composition according to claim 5 wherein the polyphenylene ether contains no more than 800 ppm. of unneutralized amino nitrogen and has an intrinsic viscosity of at least 0.25 as measured in chloroform at 25° C.

9. A composition according to claim 8 wherein the proportion of component A is about 15–35%, that of component B is about 15–50%, that of component C is about 5–35% and that of component D is about 5–20%.

* * * * *